United States Patent [19]
Goetz et al.

[11] Patent Number: 5,218,360
[45] Date of Patent: Jun. 8, 1993

[54] MILLIMETER-WAVE AIRCRAFT LANDING AND TAXING SYSTEM

[75] Inventors: Allan C. Goetz, La Jolla; Ronald K. Ching, Los Angeles; Lee L. Peterson, Fallbrook, all of Calif.

[73] Assignee: TRW Inc., Redondo Beach, Calif.

[21] Appl. No.: 946,141

[22] Filed: Sep. 17, 1992

Related U.S. Application Data

[63] Continuation of Ser. No. 704,505, May 23, 1991, abandoned.

[51] Int. Cl.⁵ .................. G01S 1/08; G01S 13/00
[52] U.S. Cl. ....................... 342/407; 342/35; 342/196
[58] Field of Search ............ 342/407, 410, 411, 414, 342/33, 35, 195, 196

[56] References Cited

U.S. PATENT DOCUMENTS

| H14 | 1/1986 | Lewis | 342/196 |
|---|---|---|---|
| 3,122,742 | 2/1964 | Hovannesian et al. | 342/179 |
| 3,237,195 | 2/1966 | Schiffman | 342/464 |
| 3,908,189 | 9/1975 | Buehler et al. | 342/35 |
| 3,952,309 | 4/1976 | Cammers | 342/411 |
| 4,101,893 | 7/1978 | Lewis | 342/411 |
| 4,225,864 | 9/1980 | Lillington | 342/196 |
| 4,591,857 | 5/1986 | Thor | 342/196 |
| 4,929,958 | 5/1990 | Hodel et al. | 342/432 |
| 4,940,986 | 7/1990 | Huguenin | 342/410 |

Primary Examiner—Gregory C. Issing
Attorney, Agent, or Firm—Noel E. Heal; Ronald L. Taylor

[57] ABSTRACT

Apparatus, and a corresponding method, for generating navigational data to aid a pilot in landing or taxiing an aircraft in poor visibility conditions. Radio-frequency (rf) beacons at predetermined locations around an airport runway or taxiway are separately modulated to render them uniquely identifiable from the aircraft. A fixed array of receiving antennas on the aircraft has multiple, angularly spaced antenna beams that substantially overlap each other in coverage, such that a signal received from one of the beacons will in most cases be received in more than one adjacent receive beam. Signals received in each beam are processed by a fast Fourier transform module to separate signal components from the various beacons; then an interpolation process determines the arrival angles of the signals by comparing the amplitudes received in adjacent receive beams. Azimuth and elevation angle values are thereby obtained for each detected beacon, and this information can be used in conjunction with conventionally obtained aircraft attitude and altitude data to produce a visual display for the pilot when landing or taxiing the aircraft.

22 Claims, 4 Drawing Sheets

MILLIMETER-WAVE AIRCRAFT LANDING AND TAXING SYSTEM

This application is a continuation of application Ser. No. 07/704,505, filed May 23, 1991 now abandoned.

BACKGROUND OF THE INVENTION

This invention relates generally to radio-frequency aircraft landing systems and, more particularly, to such systems in which an image of an airport runway is generated for the aircraft pilot. Instrument landing systems (ILS) have been in use for many years at major airports, to guide appropriately equipped aircraft along a predetermined course and "glideslope" toward the runway, until a point is reached at which the pilot has the runway in view and can make a normal landing. Under various categories of weather and visibility conditions, the pilot must be able to see the runway before making a final decision whether to continue or abort the landing. Conventional instrument landing systems do not permit a landing to be made in conditions of extremely poor visibility. Moreover, ILS approach systems are relatively costly to install at airports and are, therefore, not available at many smaller airports, even though such airports have to be used regularly by mail carriers and similar aircraft.

Other types of aids have been proposed to facilitate aircraft landings in conditions of poor visibility. In particular, systems using radio-frequency (rf) radiation to form an image of the runway, using radar principles, constitute one category of landing aid. Using a radar-type transmitter and receiver on the aircraft has the significant disadvantage that a transmitted beam must be scanned, either electromechanically with a movable antenna, or electronically using a phased array antenna. Such systems are, therefore, relatively complex to construct and maintain, and do not always provide a satisfactory image of the runway.

Another major type of landing aid using rf radiation involves the use of an rf "camera" on the aircraft, to receive rf radiation from the ground and focus it onto an image plane containing a large number of detectors. The image formed at the image plane can then be used to drive a planar display device. Such a system is disclosed in U.S. Pat. Nos. 4,910,523 and 4,940,986 issued to Huguenin et al. The principal difficulty with devices of the "camera" type is that the resolution of the resultant display is largely dependent on the number of detectors in the image plane, and therefore a large number of such detectors is required to produce a desired image.

Another type of landing aid uses conventional landing instrumentation and generates an image of the runway by predicting where it should be based on readings obtained from various ILS instruments. This might be termed a "predicted" of "indirect" runway image, and is subject to the disadvantage that the predicted image may not be as reliable as one generated from direct rf observation of the runway.

What is needed is an rf landing aid that will generate signals from which an accurate and reliable image of the outline of the runway can be synthesized, for use in poor visibility. The rf landing aid should also generate signals to drive standard aircraft instruments that provide indications of course deviation, glideslope deviation, and range of the aircraft with respect to the runway. Ideally, these functions should be provided with a relatively inexpensive device on the aircraft and with minimal expense for airport installation. The present invention meets these and other requirements.

Another requirement for aircraft taking off or landing is that of safe navigation on taxiways between the runway and airport terminal buildings. Typically, this function is handled by a ground controller, sometimes using ground-based radar, but relying for the most part on visual and radio contact with the aircraft. Smaller airports may not have ground controllers. Many unfortunate accidents on the ground could have been avoided if the aircraft had been fitted with rf devices from which an image of a taxiway could be generated for each pilot. The present invention also satisfies this requirement, as will become apparent from the following summary.

SUMMARY OF THE INVENTION

The present invention resides in the use of uniquely identifiable radio-frequency (rf) beacons at preselected locations on the ground, in conjunction with a single small diameter multibeam antenna system aboard the aircraft to provide a number of angularly spaced, substantially overlapping receive beams. Because the received rf signals are uniquely identifiable, they can be separated when many sources fall in a single beam; and because the receive beams overlap, a precise determination of each beacon's direction can be made by comparing the amplitudes of signals received in adjacent receive beams.

Briefly, the apparatus of the invention comprises a multibeam antenna system installed in an aircraft and having overlapping receive beams aligned in different directions to provide coverage of a selected field of view from the aircraft, and signal processing means, for processing signals received by the multibeam antenna system. The signal processing means includes signal analysis means, for separating signals from each beam into components having amplitudes corresponding to the strengths of signals received from a plurality of beacons or emitters installed at known locations on the ground, at least some of the emitters being located to define the outline of a runway, and angle determination means, for determining the apparent angular location of each detected emitter, whereby the determined angular directions can be used in instruments providing a visual indication of the location and course of the aircraft with respect to the runway.

The apparatus on the aircraft further comprises a spherical rf lens positioned in front of the array of rf feed antennas, and an array of rf processing modules, for converting signals received by the antennas into a form more convenient for signal processing. More specifically, each of the rf processing modules includes rf amplifier means, and detector means for converting the rf signals to video signals.

Preferably, the signal analysis means includes a fast Fourier transform (FFT) module, to separate the signals from rf processing module into frequency components, thereby uniquely identifying signal contributions from each emitter on the ground. The angle determination means includes means for determining the angular direction of each emitter by interpolating between the alignment angles of adjacent receive beams, based on the amplitudes of signals received in the adjacent receive beams from the same emitter. In the presently preferred embodiment of the invention, angle determination is effected by means of a lookup table relating a list of ratios of amplitudes of signals received in adjacent receive beams from the same emitter, to a corresponding list of angles, whereby the angular direction of the emitter can be accurately determined if the emitter signals are received in at least two adjacent receive beams.

The signal processing means may further include means for calculating the aircraft's range from the runway, its deviation from a desired course and its deviation from a desired glideslope, using the determined angles together with measurements of aircraft attitude obtained from conventional instruments, and the apparatus may further comprise a heads-up display (HUD) for displaying a synthetic image of the runway as viewed from the aircraft.

The invention may also be defined in terms of a method for providing navigational information to a pilot of an aircraft during landing or taxiing operations. Briefly, the method comprises the steps of emitting a plurality of radio-frequency (rf) signals from beacons at preselected locations on the ground, at least some of the beacons being located to define the outline of a runway or taxiway; modulating the rf signals transmitted by the beacons, such that each beacon is uniquely identifiable from an aircraft; receiving rf signals in the aircraft, using an array of rf receive antennas having overlapping receive beams aligned in different directions to provide coverage of a selected field of view from the aircraft; amplifying any received rf signals and converting them to a form in which they may be conveniently processed; and processing the converted signals, the signal processing step including separating converted signals from each rf module into components having amplitudes corresponding to the strengths of signals detected from individual beacons, and determining azimuth and elevation angles of the apparent direction of each detected beacon. If the navigation information relates only to taxiing operations, only the azimuth angles are provided. The determined angles can be used in instruments providing a visual indication of the location and course of the aircraft with respect to the runway or taxiway.

It will be appreciated from the foregoing that the present invention represents a significant advance in the field of aircraft landing and taxiing aids. When used for landing, the system of the invention generates data that can be used to produce a visual image of the runway and other navigational data, either in conventional aircraft instruments or in a heads-up display. Moreover, the invention accomplishes this with minimal airport installation time and cost. When used for taxiing, the system of the invention provides data from which a visual indication of a taxiway location can be provided, thereby significantly improving safety in airport ground operations. Other aspects and advantages of the invention will become apparent from the following more detailed description, taken in conjunction with the accompanying drawings.

DESCRIPTION OF THE PREFERRED EMBODIMENT

Figure 1:
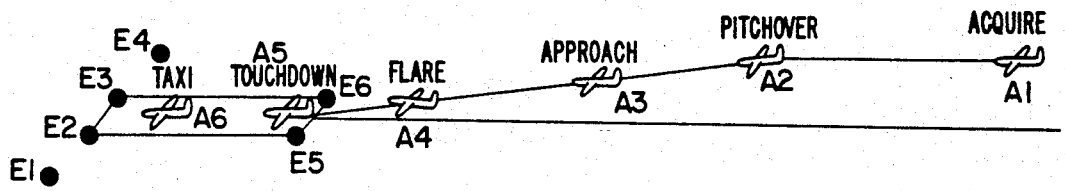
FIG. 1 is a diagrammatic view showing the landing approach path of an aircraft using the present invention.

As shown in the drawings for purposes of illustration, the present invention is concerned with radio-frequency (rf) landing and taxiing aids for aircraft. The present invention uses a sensor array of the "staring" type, as distinguished from a mechanically or electronically scanned array. However, the staring array used in the present invention is not of the "camera" type, in which a large number of detector elements are arrayed in an image plane to obtain a reasonably fine-resolution image of the runway and other objects on the ground.

In accordance with the invention, a receiver array on the aircraft has a small number of antenna beams and associated rf processing modules, which operate in conjunction with a number of fixed, uniquely identifiable rf beacons, at known locations on the ground. At least some of the beacons are positioned to define an outline of the runway. Preferably, two more widely spaced beacons provide a more accurate indication of range. The angular positions of the beacons, in elevation and azimuth with respect to the aircraft, are determined from the rf detector signals and, since the ground locations of the beacons are known, range, course deviation and glideslope deviation may be computed from these angular positions, and a synthetic image of the runway may be generated, from the angle data and conventionally obtained aircraft attitude data.

FIG. 1 shows the locations of six emitters or beacons, indicated as E1, E2, E3, E4, E5 and E6, in relation to a landing approach path of an aircraft, indicated in various positions at A1, A2, A3, A4, A5 and A6. In the presently preferred embodiment of the invention, emitters E1 and E4 are relatively widely spaced and a line connecting them is perpendicular to the approach path of the aircraft. Because of this relatively wide spacing, measurement of the angle subtended at the aircraft by these two emitters provides an accurate measure of range even when signals transmitted by the emitters are first "acquired" by the aircraft receivers, such as at the aircraft position indicated by A1.

The other emitters E2, E3, E5 and E6 form a rectangle and are located to outline a portion of the runway. For example, two of the emitters E2 and E3 are located near the far end of the runway, and the other two E5 and E6 are located near the point of touchdown. At the signal acquisition point indicated by A1, these four emitters are not easily distinguishable from each other in angular position, but as the aircraft proceeds to a point of pitchover (at A2), and begins a descent along a desired glideslope, indicated at A3, the four runway emitters become progressively more easily distinguishable, in terms of their angular positions. As will be described, these angular positions provide the raw data from which course deviation and glideslope deviation may be computed, and from which an image of the runway may be synthesized.

When the aircraft reaches the flare point, indicated at A4, just prior to touchdown, the aircraft assumes a more nose-up attitude and, because of a limited field of view of the receivers on the aircraft, emitters E5 and E6 at the beginning of the runway may be lost from view. But by this point the aircraft will have reached "decision height," at which the pilot will have decided whether to continue or abort the landing. After the point of touchdown, shown at A5, only emitters E1, E2, E3 and E4 will be detected on the aircraft, and after the aircraft slows down and approaches the far end of the runway, the receiver field of view is such that none of the emitters may then be detectable. However, at this point the aircraft is safely on the ground and, if weather or visibility conditions warrant, the pilot may switch to a different detector system, to detect radiation from other emitters located along a taxiway, none of which are shown in the figure.

In the presently preferred embodiment of the invention each of the emitters E1–E6 emits an rf frequency within the rf bandwidth of the processing module, which is amplitude modulated at a different modulation frequency for each emitter or beacon. As will shortly become apparent, the received signals from the emitters can then be separated by performing a Fourier transformation of a composite received signal. Before proceeding to discuss the remaining signal processing steps, it would probably be helpful to provide a description of the mechanical structure of the receiver assembly on the aircraft. This is shown by way of example in FIG. 2.

The sensor assembly includes a spherical rf lens 10 at its forward end, and an array of rf processing modules 12, supported by a structural combination including a mounting block 14 and a spherical saddle 16, such that the rf processing modules are arrayed radially with respect to the lens. Each of the rf processing modules 12 effects an rf-to-video signal conversion of the radiation received by the corresponding receive beam. The video signal outputs are connected by a flexible circuit 18 to signal processing circuitry 20, which includes a fast Fourier transform (FFT) module. A cover 22 is secured to the mounting block 14 and saddle 16 to hold the array of rf processing modules in position, and power supply components 24, 26 fit conveniently on the mounting block. A cylindrical housing 28 and a forward radome 30 enclose the assembly on the aircraft.

Figure 3:
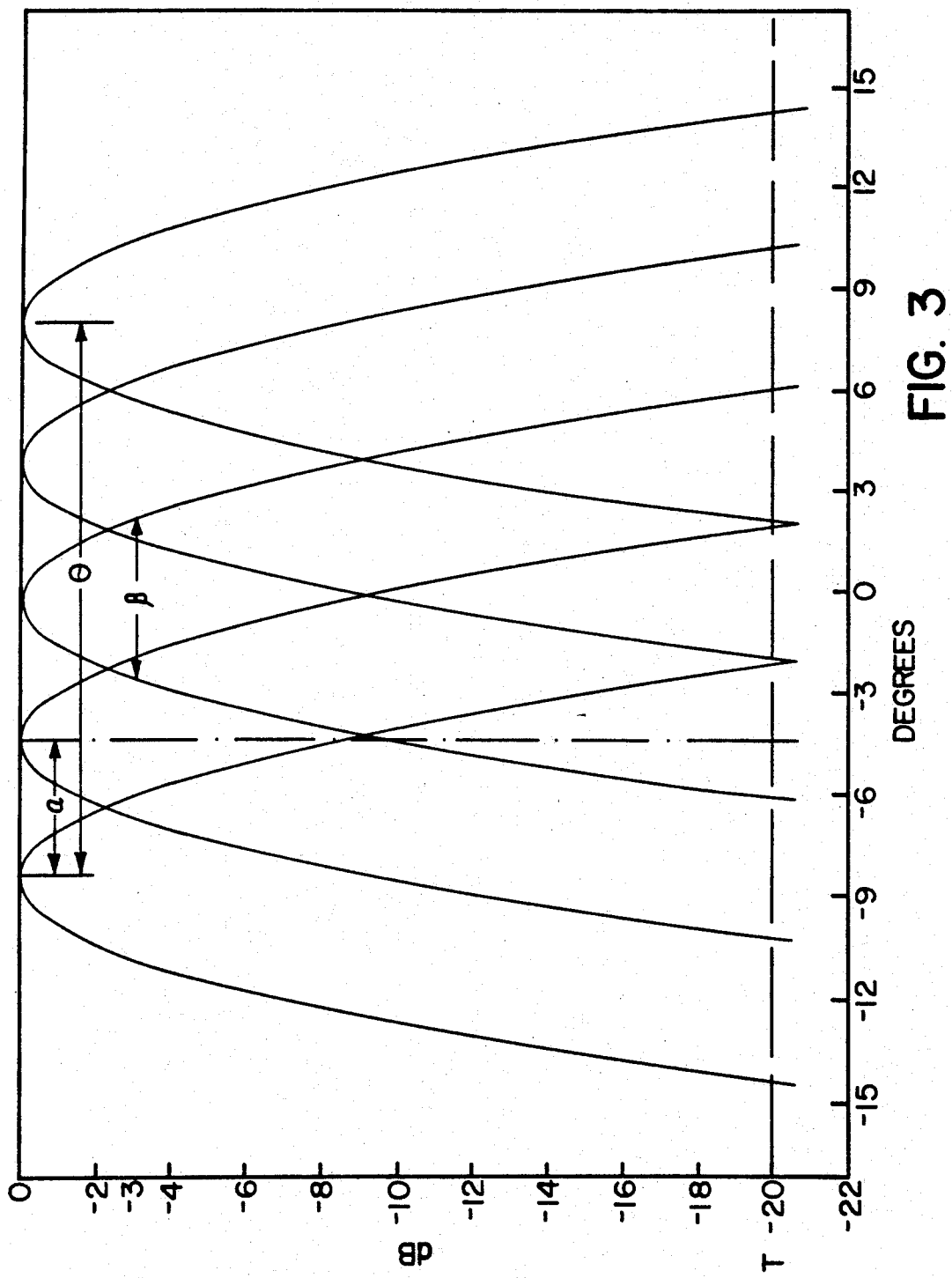
FIG. 3 is a graphical view showing the azimuth angular coverage of a row of five adjacent receive beams in the apparatus of the present invention.

The number of rf processing modules employed is determined by the field of view required to perform the task of landing or taxiing. The limited number of rf processing modules in the array cannot, of course, be used to produce a "camera-like" image of the emitters on the ground with any acceptable degree of resolution. But the angular direction of each of the emitters can be determined fairly accurately if adjacent receive beams are substantially overlapped, such that the radiation from an emitter will be detected in at least two adjacent receive beams. FIG. 3 shows the coverage of a row of five receive beams. The horizontal axis represents angular direction in degrees, with zero degrees being at the center of the array. Signal amplitude, measured in decibels (dB) below a peak value, is plotted along the vertical axis. It will be observed that the beams are spaced approximately four degrees apart, and that adjacent beams overlap at approximately the −2 dB level. The darker horizontal line represents a detection threshold based on constant false alarm control, below which any detected signals will be ignored. Other parameters shown in the figure are which $\alpha$, which is the angular spacing between adjacent beams, and $\beta$, which is the beam width at the −3 dB level.

As will be further discussed, each receive beam signal can be processed to produce separate amplitude values for each of the emitter signals that it is receiving, since the emitters are uniquely identifiable by the frequency at which they are modulated. Because of the overlap of the receive beams, and as will be apparent from FIG. 3, radiation from an emitter having a particular angle of arrival may produce detector signals in more than one receive beam. For example, emitter radiation with an angle of arrival of zero degrees will produce a peak signal (0 dB) in the central receive beam and a signal of amplitude less than 0 dB in each of the adjacent receive beams. For angles of arrival not corresponding to receive beam peaks, i.e. not falling exactly on four-degree intervals, the exact angle of arrival may be obtained mathematically by interpolation. To reduce computation time and complexity, the preferred embodiment of the invention uses a lookup table to determine the angle of arrival from the ratio of receive beam amplitudes. For example, if two adjacent beams detect equal magnitudes for a particular emitter, i.e. an amplitude ratio of 1.0, the angle of arrival must be midway between the peaks of the beams. Other amplitude ratios correspond to other angles of arrival, all of which can be predetermined and stored in the lookup table.

It should be emphasized that the useful one-dimensional angle region from which the mathematical interpolation will provide sufficient accuracy for this application extends from the peak of the first beam to the peak of the last beam, as defined by the angle $\theta$ in FIG. 3.

The foregoing description in relation to FIG. 3 has considered angles of arrival as lying in one plane, for example the azimuth angles. It will be understood, of course, that the receive beams must detect angles of arrival in a two-dimensional azimuth-elevation sense, yielding both an azimuth component and an elevation component for each detected angle of arrival of detected radiation from an emitter. Therefore, using the receive beams in the elevation domain, an identical angle interpolation procedure will be performed to obtain the elevation angle.

In the preferred embodiment of the present invention, each of the ground-based beacons or emitters E1–E6 is amplitude-modulated at a unique modulation frequency. Signals detected by each receive beam are first converted to video signals, in a manner shortly to be explained, and are then subject to processing by a fast Fourier transform (FFT) processor, so that signals from multiple emitters received at the same receiver can be segregated. As is well known, the Fourier transformation process converts signals from the time domain, i.e. time-varying signals, to the frequency domain, in which the spectral content of the signal is presented. Basically, then, each receiver produces up to six outputs (if there are six emitters), each output with its own separately detectable amplitude. Once these amplitudes are obtained, further signal processing involves the computation of amplitude ratios for each adjacent pair of receive beams, in elevation and in azimuth, for each emitter. Then the ratios can be used in conjunction with the lookup table referred to earlier, to obtain more precise azimuth and elevation angles for each of the emitters within the field of view.

Figure 2:
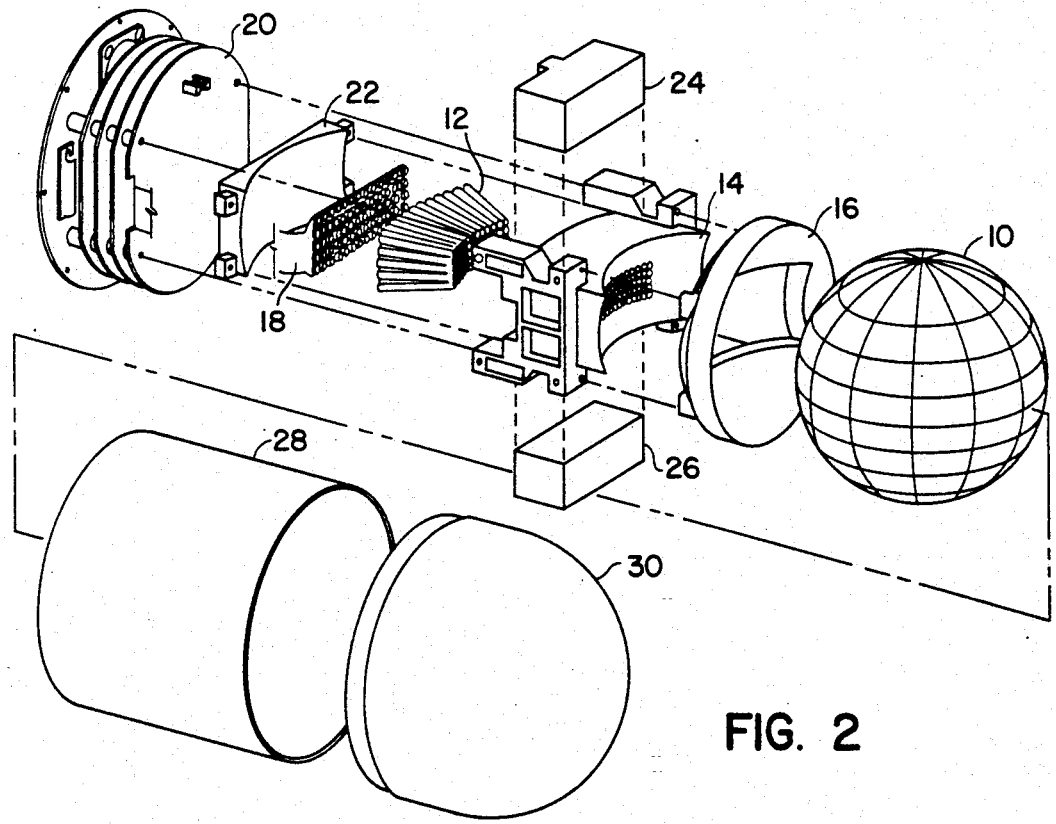
FIG. 2 is an exploded perspective view of a multibeam antenna system in accordance with the present invention.

Before these signal processing functions are further discussed, some of the components of the receiver assembly of FIG. 2 will be further described. The lens 10 is a spherical dielectric lens. Its spherical shape permits the placement of multiple antenna feeds about the periphery, each generating a pencil beam antenna pattern. The lens 10 is designed for a frequency of operation between 34 and 37 GHz. This is a preferred frequency range to provide optimum penetration of water vapor in adverse weather conditions. The beam widths are designed for a high degree of overlap between adjacent beams, consistent with the foregoing discussion concerning the computation of angles from amplitude ratios of adjacent beams.

Figure 4:
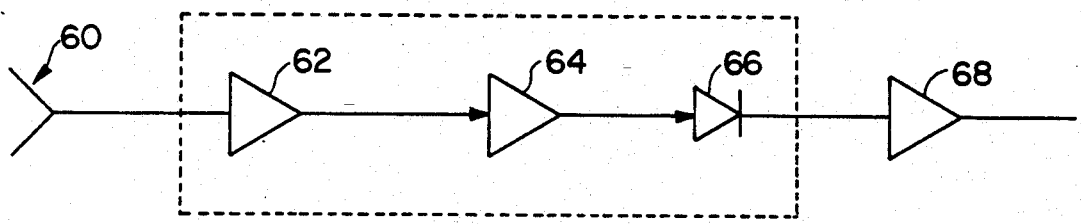
FIG. 4 is a simplified schematic view of one of the rf processing modules included in the multibeam antenna system shown in FIG. 2.

Each rf processing module 12 includes the components shown diagrammatically in FIG. 4, namely an antenna feed 60, cascaded rf amplifiers 62, 64, a video detector 66, and a video amplifier 68. The antenna feed 60 presents a circular waveguide to the lens 10, and includes a transition to change the field mode of the received radiation from circular to linear and to couple the field to the first rf amplifier 62. The characteristics of the rf amplifiers 62, 64 include an operating frequency of 35 GHz, a bandwidth of 1 GHz or more, a total gain of 30 dB to 38 dB, and a noise figure of less than 8 dB. TRW Inc. makes a suitable cascaded balanced HEMPT rf amplifier, designated as 2640BCLNA. An alternative is an rf amplifier manufactured by Avantek and designated AMT-36044-33.

The detector 66 can be of any suitable design, such as one manufactured by MACOM and designated the Model 4-00-715. This is a Schottky barrier detector having a frequency range of 18–40 GHz, generating a video output signal from an rf input signal. The video amplifier 68 increases the signal level to provide suitable input to an analog-to-digital converter that follows the rf module 12. Its characteristics are not critical except that they must be matched to the input requirements of the downstream components.

Figure 5:
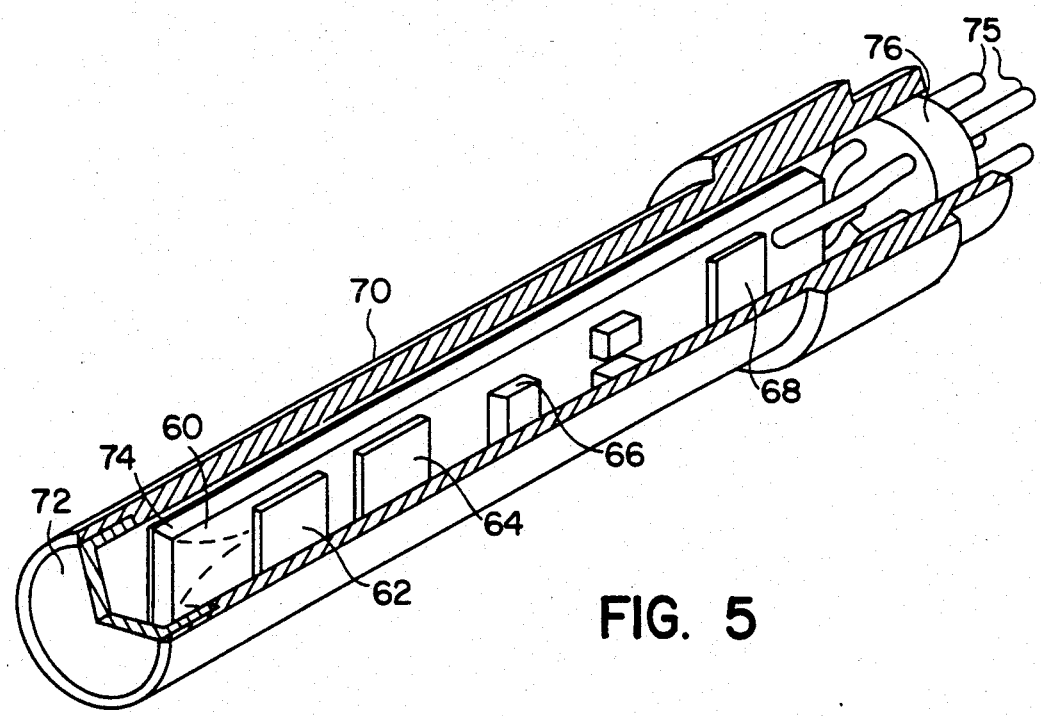
FIG. 5 is a simplified perspective view of one of the rf processing modules included in the multibeam antenna system shown in FIG. 2.

FIG. 5 shows the mechanical structure of one of the rf processing modules 12 in simplified form. The module 12 is basically cylindrical in shape and has an elongated body 70 with a part-spherical endcap 72 for coupling to the lens 10. Behind the endcap 72 is the antenna feed element 60. The rf amplifiers 62, 64, the detector 66, and the video amplifier 68 are mounted with other components on a single substrate 74. Power input and video output leads 75 are brought out through a glass header 76 located at the end of the body 70 opposite the endcap 72. In the preferred embodiment of the invention, the entire module 12 measures approximately 0.15 inch diameter and 1.25 inches in length.

Figure 6:
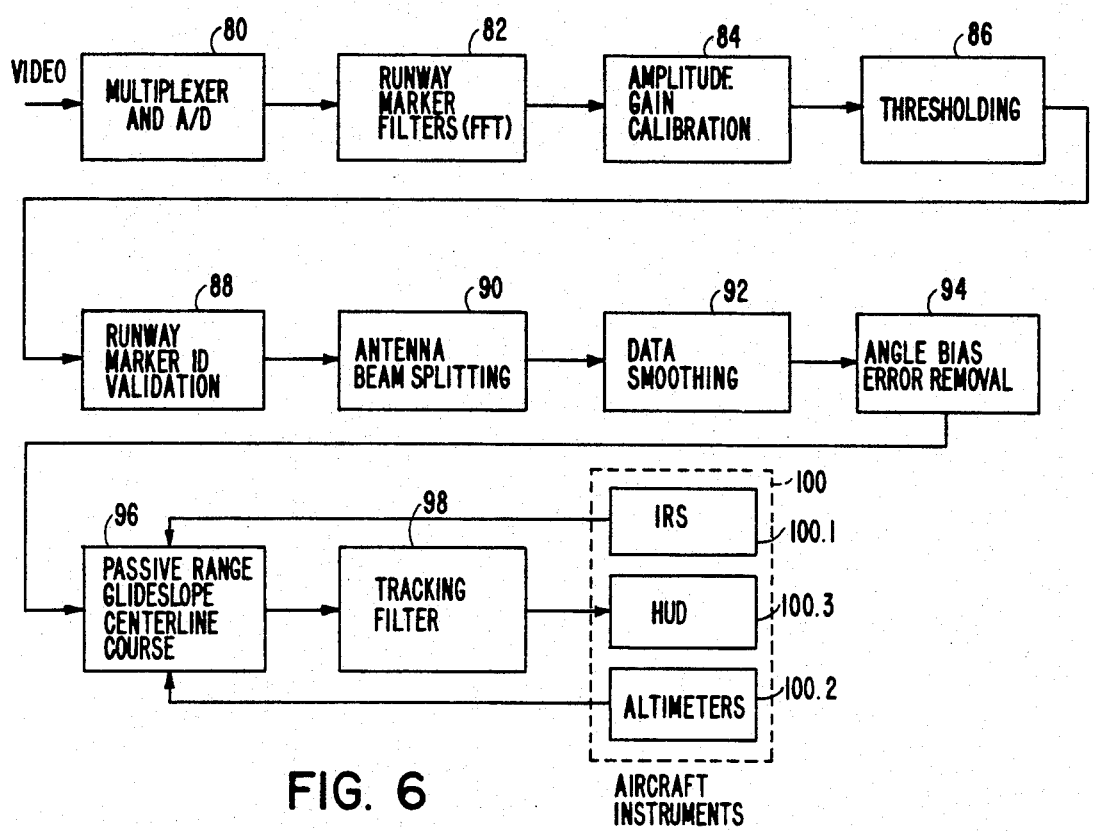
FIG. 6 is a block diagram showing the signal processing functions performed in the apparatus of the invention.

The signal processing functions of the invention are shown in FIG. 6. The video signals received from the rf processing modules 12 are first multiplexed and converted to digital form, as indicated in block 80. The signals are multiplexed such that the rf processing modules are sampled on a continuous and cyclic basis, but, with the use of random access memories (not shown), a continuous sequence of digitized signal samples is generated for each receive beam, for processing by a fast Fourier transform (FFT) module 82. The FFT module 82 produces, for each rf processing module 12, a set of amplitudes and emitter identifiers. Each such set may vary in number from zero, when no emitters are in the field of view of the receive beam, to six, assuming a maximum of six emitters are located on the ground.

The next signal processing step is that of amplitude gain calibration, as indicated in block 84. The components in the rf processing modules 12 will not always produce a theoretically desired amplitude gain, so a calibration procedure is needed, wherein a known and uniform rf input signal is applied to all of the rf processing modules simultaneously and the output amplitudes are measured for purposes of calibration. Correction factors are computed at the time of calibration, and these are applied to the signal amplitudes output by the FFT module 82 during normal operation.

The next processing step is that of thresholding the amplitude signals, as indicated in block 86. Amplitudes below a threshold level are ignored for purposes of the invention. Next, the emitter identifiers are validated (block 88), to be sure that an intended runway has been detected. Processing in this step may also include displaying an identification of the runway, or notifying the pilot of possible errors.

The next step is that of antenna beam splitting, indicated at 90. This is the interpolation procedure described earlier, in which amplitude ratios are computed for each pair of overlapping receive beams, both for azimuth and elevation angles, and for each detected emitter signal. From these ratios, precise azimuth and elevation angles are obtained from lookup tables. Thus, processing block 90 generates successive sets of angle solutions for the locations of all of the detectable emitters on the ground.

Signal processing next includes a data smoothing step 92, for reducing the data rate and providing for smoother changes of observed emitter positions. The next step in processing is the removal of angle bias errors from the data, indicated in block 94. Ideally, the center of the receive beam array is aligned at some predetermined angle with respect to the longitudinal axis of the aircraft. Typically the antenna array is pointed down with respect to the aircraft axis, but its alignment must be precisely known and maintained if the computations of emitter positions are to be accurate and reliable. Unfortunately, rf processing module gain may change slightly with the passage of time or due to changes in temperature. Some form of calibration is needed to remove this type of error from the computations. The calibration may be performed occasionally during routine maintenance, or a more sophisticated real-time computation procedure may be employed.

At this point, after block 94, the signal processing apparatus of the invention has produced successive sets of angular locations, with respect to the aircraft, for all of the ground-based emitters detected by the receive beam array. These signals may be employed in a variety of ways in an instrument interface, shown generally by blocks 96, 98 and 100 in FIG. 6. The basic purpose of the instrument interface is to provide a connection between the generated angle and emitter-identifying data and standard aircraft instrumentation. There are three basic measurements that are of interest to the pilot of an aircraft on final approach to an airport runway: the passive range or distance to the runway, the deviation of the aircraft from a desired course, and the deviation of the aircraft from a desired glideslope. These three measurements are computed as indicated in block 96 of the instrument interface, but require a knowledge of the aircraft attitude, and preferably also its altitude. Attitude measurements may be obtained from conventional aircraft instruments, such as an inertial reference system (IRS), indicated at 100.1, an inertial navigation system (INS), or directional gyros. Altimeters 100.2 may be used to provide altitude data to the instrument interface. Computation of range is made by reference to the angular difference between two widely spaced emitters (E1 and E4) on the ground. But this measurement alone is meaningless unless the aircraft is aligned with the runway, so the attitude of the aircraft must also be taken into account in determining the range. The same is also true for the determination of other aspects of the aircraft position, i.e. its deviation from course and glideslope. Aircraft attitude and altitude data is available on most aircraft in digital or analog form. Most common today is the digital format defined by a data bus specification referred to as ARINC 429. For military aircraft the digital format is commonly defined by the MIL-STD-1553B data bus. Using one of these data bus standards, attitude data can be derived from the conventional aircraft instruments. Moreover, calculated data concerning range, deviation from course and deviation from glideslope, can be output to conventional aircraft display instruments normally used in an ILS environment.

Figure 7:
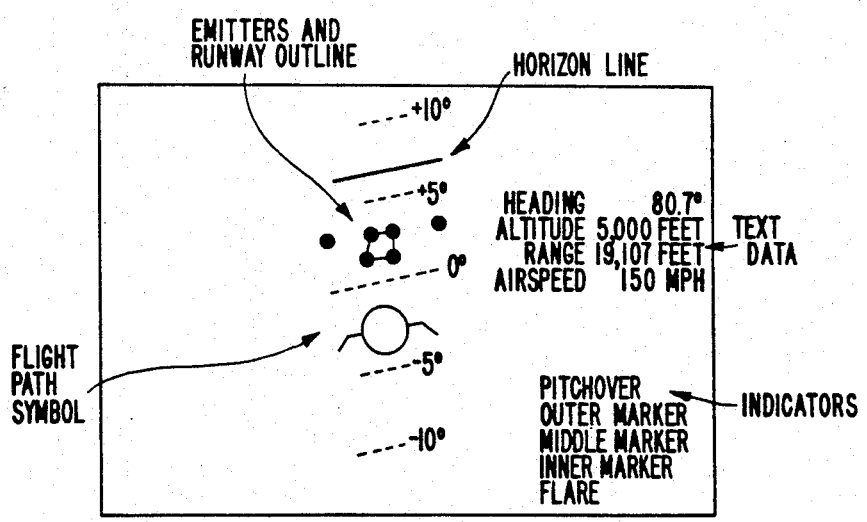
FIG. 7 is a graphical view depicting a typical heads-up display (HUD) output using the information provided by the apparatus of the invention.

A more effective use of the emitter angle and identification data generated by the invention is the operation of a heads-up display, commonly referred to as HUD, to provide the pilot with a synthetic image of the runway and related data, projected at eye level so that the display can be seen while looking forward to where the runway should be. An example of a HUD output is given in FIG. 7. The display shows the six emitter positions, a runway outline, an artificial horizon line, a flight path symbol, and some lines parallel to the horizon, providing an elevation angle reference. On the right side of the display, the pilot is provided textual indications of heading angle, altitude, range and airspeed, and indicators in the bottom-right corner of the display show the phase of the approach that the aircraft is in.

The data displayed by the HUD system, indicated in block 101.3, is derived from the same angle information used in block 96, after filtering in a tracking filter 98. The HUD data includes both emitter position and identification values, and aircraft attitude and altitude data derived from conventional instrumentation. HUD systems are supplied by various manufacturers, including Flight Dynamics Incorporated.

The same principles that are used to locate runway beacons on landing can also be employed to locate taxiway beacons when taxiing the aircraft on the ground. The principal differences are that the overall field of view of the aircraft receive beams has to be greater in azimuth (but smaller in elevation) than the relatively narrow, forward-looking field that is used for the landing approach, and that the taxiway beacons can be of lower power, since they are all relatively close to the aircraft. When using the taxiing aid, the pilot switches to a different antenna array to provide an appropriate field of view to the sides as well as forward of the aircraft. Signal processing is basically the same as in the landing system, with each taxiway emitter or beacon being uniquely identifiable and its angular azimuth location determined with respect to the aircraft. Signal processing for the taxiing aid is relatively simple because it should be sufficient in most cases to identify the angular locations of the beacons with respect to the aircraft frame of reference. Depending on the field of view selected in a particular design, the heads-up display may have to be larger that that used during landing.

It will be appreciated from the foregoing that the present invention represents a significant advance in the field of aircraft landing and taxiing instrument systems. In particular, the invention provides a technique for accurately determining the angular locations of uniquely identifiable beacons close to a runway, and this angle-identity information can be used to compute course deviation, glide slope deviation, and range, for display in conventional aircraft instruments, and can also be used to control a heads-up display containing a synthetic image of an outline of the runway. Therefore, landing approaches can be made in marginal weather, at airports that do not have conventional instrument landing systems. The invention has the advantage that ground installation of the beacons is less costly than a conventional instrument landing system. The ground-based beacons are relatively small and light in weight, and can be installed quickly, if needed, at a runway without an instrument landing system. When the principles of the invention are used as a taxiing aid, the invention helps avoid serious collision accidents that might otherwise occur, especially in poor visibility, between aircraft on the ground or between one aircraft on the ground and another that is taking off or landing. It will also be appreciated that, although an embodiment of the invention has been described in detail for purposes of illustration, various modifications may be made without departing from the spirit and scope of the invention. Accordingly, the invention is not to be limited except as by the appended claims.

We claim:

1. An aircraft landing or taxiing aid, comprising:
    a multiple beam antenna system installed in an aircraft and having overlapping receive beams aligned in different directions to provide coverage of a selected field of view from the aircraft; and
    signal processing means, for processing signals received by the multiple beam antenna system, the signal processing means including
    signal analysis means, for separating signals from each receive beam into components having amplitudes corresponding to the strengths of signals received from a plurality of emitters installed at known locations on the ground, at least some of the emitters being located to define the outline of a runway, and
    angle determination means, for determining the apparent angular location of each detected emitter, whereby the determined angular directions can be used in instruments providing a visual indication of the location and course of the aircraft with respect to the runway;
    wherein each emitter is modulated at a different selected frequency, and the signal analysis means includes a fast Fourier transform (FFT) module, to separate the signals from each receive beam into frequency components, thereby uniquely identifying signal contributions from each emitter on the ground, said fast Fourier transform module generating a set of amplitudes for each of the identified emitters, wherein the angle determination means uses the generated amplitudes to determine the angular direction of each emitter.

2. An aircraft landing or taxiing aid as defined in claim 1, and further comprising:
    a spherical rf lens positioned in front of the multiple beam antenna system; and
    an array of rf processing modules, including means for converting signals received by the antennas into digital form, which is more convenient for signal processing.

3. An aircraft landing or taxiing aid as defined in claim 2, wherein:

each of the rf processing modules includes rf amplifier means, and detector means for converting the rf signals to video signals.

4. An aircraft landing or taxiing aid as defined in claim 1, wherein:

the angle determination means includes means for determining the angular direction of each emitter by interpolating between the alignment angles of adjacent receive beams, based on the amplitudes of signals received in the adjacent receive beams from the same emitter.

5. An aircraft landing or taxing aid as defined in claim 4, wherein:

the angle determination means further includes a lookup table relating a list of ratios of amplitudes of signals received in adjacent receive beams from the same emitter, to a corresponding list of angles, whereby the azimuth angular direction of the emitter can be accurately determined if the emitter signals are received in at least two adjacent azimuth receive beams, and the elevation angular direction can be accurately determined if the emitter signals are received in at least two adjacent elevation beams.

6. An aircraft landing or taxiing aid as defined in claim 1, wherein the signal processing means further includes:

means for calculating the aircraft's range from the runway, its deviation from a desired course and its deviation from a desired glideslope, using the determined angles together with measurements of aircraft attitude obtained from conventional instruments.

7. An aircraft landing or taxiing aid as defined in claim 4, and further comprising:

a heads-up display (HUD) for displaying a synthetic image of the runway as viewed from the aircraft.

8. An aircraft landing or taxiing aid as defined in claim 1, wherein:

the multiple beam antenna system includes a two-dimensional array of antenna of rf receive antennas; and the angle determination means determines the angular locations of the emitters in terms of azimuth angles and elevation angles.

9. An aircraft landing or taxiing system, comprising:

a plurality of radio-frequency (rf) emitters installed at preselected locations on the ground, at least some of the emitters being located to define the outline of a runway;

means for modulating rf signals transmitted by the emitters, such that each emitter is uniquely identifiable by a different selected modulation frequency;

a multiple beam antenna system installed in an aircraft and having overlapping receive beams aligned in different directions to provide coverage of a selected field of view from the aircraft;

a corresponding array of rf processing modules coupled to the multiple beam antenna system, including means for converting any received signals to digital form, in which they may be conveniently processed; and signal processing means, for further processing signals from the array of rf modules, and including signal analysis means, for separating signals from each rf module into components having amplitudes corresponding to the strengths of signals detected from individual emitters, an further including angle determination means, for determination azimuth and elevation angles of the apparent direction of each detected emitter, whereby the determined azimuth and elevation angles can be used in instruments providing a visual indication of the location and course of the aircraft with respect to the runway;

wherein the signal analysis means includes a fast Fourier transform (FFT) module, to separate the signals from each receive beam into frequency components, thereby uniquely identifying signal contributions from each emitter on the ground, said fast Fourier transform module generating a set of amplitudes for each of the identified emitters, wherein the angle determination means uses the generated amplitudes to determine the angular direction of each emitter.

10. An aircraft landing or taxiing system as defined in claim 9, and further comprising:

a spherical rf lens positioned in front of the array of the multibeam antenna system;

and wherein the rf processing modules convert the received rf signals to video signals.

11. An aircraft landing or taxiing system as defined in claim 10, wherein:

each of the rf processing modules includes rf amplifier means, and detector means for converting the rf signals to video signals.

12. An aircraft landing or taxiing system as defined in claim 11, wherein:

the angle determination means includes means for determining the angular direction of each emitter by interpolating between the alignment angles of adjacent receive beams, based on the amplitudes of signals received in the adjacent receive beams from the same emitter.

13. An aircraft landing or taxiing system as defined in claim 12, wherein:

the angle determination means further includes a lookup table relating a list of ratios of amplitudes of signals received in adjacent receive beams from the same emitter, to a corresponding list of angles, whereby the angular direction of the emitter can be accurately determined if the emitter signals are received in at least two adjacent receive beams.

14. An air landing or taxiing system as defined in claim 9, wherein the signal processing means further includes:

means for calculating the aircraft's range from the runway, its deviation from a desired course and its deviation from a desired glideslope, using the determined angles together with measurements of aircraft attitude obtained from conventional instruments.

15. An aircraft landing or taxiing system as defined in claim 14, and further comprising:

a heads-up display (HUD) for displaying a synthetic image of the runway as viewed from the aircraft.

16. A method for providing navigational data to a pilot of an aircraft during landing or taxiing operations, the method comprising the steps of:

emitting a plurality of radio-frequency (rf) signals from beacons at selected locations on the ground, at least some of the beacons being located to define the outline of a runway;

modulating the rf signals transmitted by the beacons, such that each beacon is modulated at a different selected frequency and is uniquely identifiable from an aircraft;

receiving rf signals in the aircraft, using an array of rf antennas having overlapping receive beams aligned in different directions to provide coverage of a selected field of view from the aircraft;

amplifying any received rf signals and converting them to digital form, in which they may be conveniently processed; and processing the converted signals, the signal processing step including separating converted signals from each rf module into components having amplitudes corresponding to the strengths of signal detected from individual beacons, and determining azimuth and elevation angles of the apparent direction of each detected beacon, whereby the determined azimuth and elevation angles can be used in instruments providing a visual indication of the location and course of the aircraft with respect to the runway;

wherein the step of separating converted signals into components includes performing a fast Fourier transformation (FFT) on the converted signals, to separate them into frequency components, thereby uniquely identifying signal contributions from each beacon on the ground, the step of performing a fast Fourier transform including generating a set of amplitudes for each of the emitters, wherein the step of determining azimuth and elevation angles includes using the generated amplitudes to determine the angular direction of each emitter.

17. A method as defined in claim 16, wherein:
the step of converting converts the received rf signals to video signals.

18. A method as defined in claim 16, wherein:
the step of determining azimuth and elevation angles includes determining the angular direction of each beacon by interpolating between the alignment angles of adjacent receive beams, based on the amplitudes of signals received in the adjacent receive beams from the same beacon.

19. A method as defined in claim 18, wherein:
the determining step further includes accessing a lookup table relating a list of ratios of amplitudes of signals received in adjacent receive beams from the same beacon, to a corresponding list of angles, whereby the angular direction of the beacon can be accurately determined if the emitter signals are received in at least two adjacent receive beams.

20. A method as defined in claim 16, wherein the signal processing step further includes:
calculating the aircraft's range from the runway, its deviation from a desired course and its deviation from a desired glideslope, using the determined angles together with measurements of aircraft attitude obtained from conventional instruments.

21. A method as defined in claim 20, and further comprising:
displaying, on a heads-up display (HUD), a synthetic image of the runway as viewed from the aircraft.

22. A method as defined in claim 16, wherein:
least some of the beacons are located to define part of a taxiway;
the method further comprises generating a displayable image of at least one of the beacons defining part of the taxiway, to permit the aircraft to taxi safely in conditions of poor visibility.

* * * * *